3,539,569
PREPARATION OF PYRAZINOYLGUANIDINES
FROM PYRAZINOYLUREAS
Roger J. Tull, Metuchen, and Peter I. Pollak, Scotch Plain, N.J., assignors to Merck & Co., Inc., Rahway, N.J., a corporation of New Jersey
No Drawing. Filed Aug. 21, 1968, Ser. No. 754,451
Int. Cl. C07d 51/76
U.S. Cl. 260—250                                                 11 Claims

ABSTRACT OF THE DISCLOSURE

A process is described for the preparation of (pyrazinoyl)guanidines which comprises the treatment of a (pyrazinoyl)urea with a guanidine. The products have utility as diuretic and/or natriuretic agents.

---

This invention is concerned with a novel process for the preparation of (3,5-diamino-6-halopyrazinoyl)guanidine compounds which possess useful diuretic properties but more importantly they selectively enhance the excretion of sodium and chloride ions while suppressing the excretion of potassium ions. The products prepared by the novel process of this invention are especially useful in the treatment or the management of edema and other abnormalities resulting from the retention of excess quantities of sodium and/or fluid by the animal organism.

The novel process of this invention involves the reaction of a (3,5-diamino-6-halopyrazinoyl)urea, I, with a guanidine, II, to give the desired (3,5-diamino-6-halopyrazinoyl)guanidine product, III. This novel process represents a simple and economical method by which an important group of diuretic and/or natriuretic products can be produced.

The reaction comprises treating a (pyrazinoyl)urea with an excess of a guanidine in a polar nonhydroxylic solvent such as dimethylformamide, dimethylsulfoxide, dimethylsulfone or tetramethylurea at a temperature from about 50–100° C. for from 5 to about 12 hours. The mixture is then treated with an excess of a dilute mineral acid such as hydrochloric acid in order to precipitate the (pyrazinoyl)guanidine as the acid addition salt which is collected and purified as the salt or is converted by standard techniques to the free base. The guanidine in the above reaction is conveniently formed in situ from one of its salts such as the hydrochloride by adding to the reaction mixture an alkali metal alkoxide such as sodium methoxide, sodium ethoxide, or the corresponding potassium alkoxides. This process can be illustrated by the following reaction scheme:

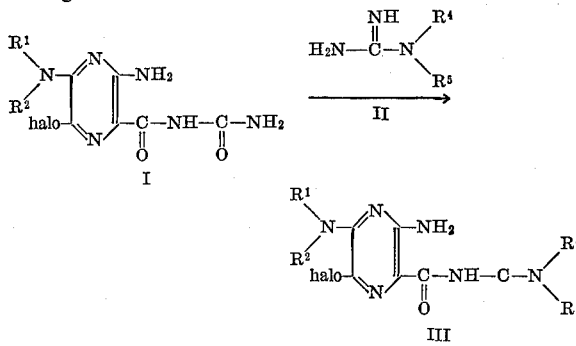

wherein halo represents chloro or bromo; $R^1$ and $R^2$ can be the same or dissimilar groups selected from hydrogen, lower alkyl, advantageously having from one to five carbon atoms, as methyl, ethyl, propyl, isopropyl, butyl, amyl, or any other branched 4 or 5 carbon alkyl groups, lower alkenyl advantageously having from 3 to 5 carbon atoms and particularly the allyl, propargyl or 3-pentenyl and the like, or a lower(cycloalkylalkyl) group advantageously having from 4 to 8 carbon atoms such as cyclopropylmethyl, cyclopentylmethyl, cyclohexylmethyl, cyclohexylethyl, cyclopropylethyl and the like; $R^4$ represents hydrogen, lower alkyl advantageously having from 1 to 5 carbon atoms, such as methyl, ethyl, propyl, isopropyl, butyl, amyl, or any of the branched 4 or 5 carbon alkyl groups, or substituted lower alkyl groups having from 1 to 5 carbon atoms and particularly those containing hydroxy or a heterocyclic substituent such as the pyridyl substituent or a phenyl substituent, the phenyl-lower alkyl advantageously having an alkyl moiety of 1 to 2 carbon atoms and the phenyl moiety being either unsubstituted or substituted with 1 or more halogen (preferably chlorine, bromine, fluorine), lower alkyl (having 1 to 2 carbon atoms) and lower alkoxy (having 1 to 2 carbon atoms) groups; $R^5$ advantageously is hydrogen, lower alkyl having 1 to 5 carbon atoms such as methyl, ethyl, propyl, isopropyl, butyl, amyl or any of the branched 4 or 5 carbon alkyl groups, phenyl-lower alkyl wherein the alkyl moiety advantageously has from 1 to 2 carbon atoms and the phenyl moiety being either unsubstituted or having one or more substituents selected from halogen (advantageously chlorine, bromine, fluorine), lower alkyl (advantageously having from 1 to 2 carbon atoms) and lower alkoxy (having 1 to 2 carbon atoms) groups; when $R^4$ and $R^5$ are each lower alkyl, they can be linked together to form a cyclic structure with the nitrogen atom to which they are attached, thereby forming a group having the structure

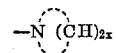

wherein $x$ preferably is one of the numerals from 4 through 7 thus yielding, for example, the 1-pyrrolidinyl group.

The (3,5-diamino-6-halopyrazinoyl)ureas used as the starting material in the novel process of this invention can be prepared according to the following reaction scheme:

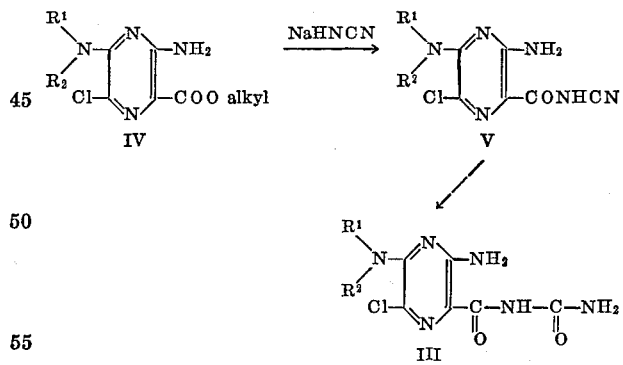

The process comprises dissolving cyanamide in an anhydrous lower alkanol such as methanol, ethanol or propanol containing approximately an equivalent amount of an alkali metal such as sodium or potassium. After one-half to one hour at a temperature between ambient and reflux, solid pyrazinoic acid ester, IV, is added and the mixture is refluxed for an additional 2 to about 24 hours during which time a solid separates. This is collected by filtration, dissolved in water and the solution is made slightly acid by addition of an acid such as hydrochloric, hydrobromic, sulfuric, acetic, propionic or the like. Purification by recrystallization provides the intermediate (pyrazinoyl)-cyanamide, V.

The (pyrazinoyl)cyanamide is converted directly to the (pyrazinoyl)urea, III, by suspending the (pyrazinoyl)-cyanamide in dilute aqueous mineral acid such hydrochloric, hydrobromic, sulfuric acid or the like of from 3 to about 10 N in strength, preferably about 6 N and agitating the suspension until conversion to the (pyrazinoyl)urea is complete, that is from about 20 to about 30 hours at ambient temperature. The reaction can be conducted at temperatures between about 5 to 100° C., however, temperatures below ambient prolong the reaction time unnecessarily and temperatures above ambient lead to undesirable side reactions. When conversion is complete, the product is isolated by filtration and recrystallization.

The examples which follow demonstrate the preparation of the (pyrazinoyl)cyanamide and the (pyrazinoyl)-urea intermediates as well as the process of this invention by the preparation of several (pyrazinoyl)guanidines.

It is to be understood that the invention is not limited to the reagents and conditions employed in the specific examples but extends to reasonable variations thereof cognizable to those skilled in the art.

EXAMPLE 1

(3,5-diamino-6-chloropyrazinoyl)guanidine

Step A: Preparation of (3,5-diamino-6-chloropyrazinoyl)cyanamide.—Cyanamide (13.6 g., 0.324 mole) is dissolved in a solution of sodium (7.6 g., 0.324 mole) in absolute methanol (525 ml.). This solution is refluxed for one-half hour and methyl 3,5-diamino-6-chloropyrazinoate (22.0 g., 0.108 mole) is added. Refluxing is continued for twenty-four hours and the solid that separates during this time is collected by filtration. The solid is dissolved in warm water (750 ml.), treated with decolorizing carbon and filtered. The filtrate is acidified to congo red paper by the addition of dilute hydrochloric acid and the (3,5-diamino-6-chloropyrazinoyl)-cyanamide that precipitates is collected and dried, yield 11.5 g. (50% yield), M.P. >330° C.

Step B: Preparation of (3,5-diamino-6-chloropyrazinoyl)urea.—3,5 - diamino-6-chloropyrazinoyl)cyanamide (0.50 g.) is suspended in dilute hydrochloric acid (10 ml., 6 N) and this mixture is stirred at room temperature for twenty-four hours. The (3,5-diamino-6-chloropyrazinoyl)urea is collected by filtration, washed with water and dried to yield 0.22 g., M.P. >300° C. Further purification is accomplished by recrystallization from methyl alcohol, M.P. >300° C.

Analysis.—Calc. for $C_6H_7ClN_6O_2$ (percent): C, 31.24; H, 3.06; N, 36.44. Found (percent): C, 31.25; H, 3.36; N, 36.28.

Step C: Preparation of (3,5-diamino-6-chloropyrazinoyl)guanidine.—A mixture (3,5-diamino-6-chloropyrazinoyl)urea (0.1 mole) in 120 ml. of dimethyl formamide is treated with guanidine hydrochloride (0.5 mole) and sodium methoxide (0.45 mole). The mixture is stirred at 70° C. under nitrogen for 8 hours, cooled to 40° C. and treated with 360 ml. of 1.5 N hydrochloric acid. The mixture is cooled to 5° C. for 1 hour and the (3,5 - diamino-6-chloropyrazinoyl)guanidine hydrochloride is collected by filtration, washed with 1.5 N hydrochloric acid and air dried. This material is converted to the free base by dissolving it in water and adding a slight excess of sodium hydroxide slowly with stirring. The precipitated (3,5-diamino - 6 - chloropyrazinoyl)-guanidine is collected by filtration, washed well with water and air dried, M.P. 240.5–241.5° C.

The following table identifies other products prepared by the process of this invention. The method employed for preparing these compounds is substantially that described in Example 1, steps A to C, with the variations in solvents and temperatures described previously, comprising the reaction of the appropriate methyl 3-amino-5-$NR^1R^2$-6-halopyrazinoate with an alkali metal salt of cyanamide to form the corresponding pyrazinoyl-cyanamide which is then treated with an aqueous mineral acid to form the (pyrazinoyl)urea. Treatment of the (pyrazinoyl)urea with a 1-$R^4$-1-$R^5$-guanidine provides the 1 - (3-amino-5-$NR^1R^2$-6-halopyrazinoyl)-3-$R^4$-3-$R^5$-guanidine end products. The reactants as well as the products are identified in the table; the variables $R^1$, $R^2$, $R^4$ and $R^5$ in the starting materials are not changed by the reaction conditions employed and remain unchanged in the end-product produced and identified in the table.

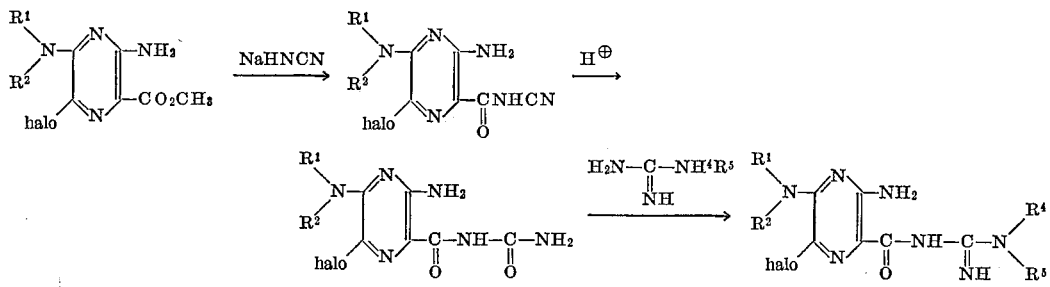

| Example | Halo | $R^1$ | $R^2$ | $R^4$ | $R^5$ | M.P.° C. (dec.) of end product [1] |
|---|---|---|---|---|---|---|
| 2 | Br | H | H | H | H | 232.5–235.5 |
| 3 | Cl | H | H | $CH_3-$ | H | 252–254 |
| 4 | Cl | H | H | $CH_3-$ | $CH_3-$ | [2] 277 |
| 5 | Cl | H | H | $C_2H_5-$ | $C_2H_5-$ | 265 |
| 6 | Cl | H | H | $CH_3-$ | $-CH_2-\langle\phantom{x}\rangle$ | [3] 274.5 |
| 7 | Cl | H | H | $-CH_2CH_2OH$ | H | [3] 228.5–229.5 |
| 8 | Cl | H | H | $-CH_2-\langle\phantom{x}\rangle$ | H | 215–216 |
| 9 | Cl | H | H | $-CH_2-\langle\phantom{x}\rangle$-Cl | H | 220–223 |

See footnotes at end of table.

| Example | Halo | R¹ | R² | R⁴ | R⁵ | M.P. °C. (dec.) of end product [1] |
|---|---|---|---|---|---|---|
| 10 | Cl | H | H | —CH₂—C₆H₄—F | H | 216–219.5 |
| 11 | Cl | H | H | —CH₂—C₆H₄—CH₃ | H | 210–212 |
| 12 | Cl | H | H | —CH₂—C₆H₄—OCH₃ | H | 175.5–179.5 |
| 13 | Cl | H | H | —CH₂—C₆H₃(CH₃)—CH₃ | H | 220–222 |
| 14 | Cl | H | H | —CH(CH₃)—C₆H₅ | H | 152–160 |
| 15 | Cl | H | H | —CH₂CH₂—C₆H₅ | H | 219–221.5 |
| 16 | Cl | H | H | —CH₂—(pyridyl) | H | [4] 280.5–283.5 |
| 17 | Cl | H | iC₃H₇— | CH₃— | H | 300 |
| 18 | Cl | H | iC₃H₇— | CH₃— | CH₃— | 238.5–240 |
| 19 | Cl | H | iC₃H₇— | —CH₂CH₂OH | H | [5] 185–186 |
| 20 | Cl | H | iC₃H₇— | CH₂—C₆H₅ | H | 200.5–204.5 |
| 21 | Cl | H | —CH₂CH=CH₂ | H | H | 213–214 |
| 22 | Cl | H | —CH₂CH=CH₂ | CH₃— | CH₃— | 213–215 |
| 23 | Cl | H | nC₄H₉— | CH₃— | CH₃— | 187.5 |
| 24 | Cl | H | —CH₂—cyclopropyl | H | H | 220–221.5 |
| 25 | Cl | CH₃— | CH₃— | H | H | 216–217 |
| 26 | Cl | CH₃— | C₂H₅— | H | H | 229–230 |
| 27 | Cl | CH₃— | nC₃H₇— | H | H | 214–215 |
| 28 | Cl | CH₃— | iC₃H₇— | H | H | 207–208 |
| 29 | Cl | CH₃— | iC₃H₇— | CH₃— | CH₃— | 209–211 |
| 30 | Cl | C₂H₅— | C₂H₅— | CH₃— | CH₃— | 212–214 |

[1] As free base unless otherwise noted.
[2] HCl monohydrate.
[3] HCl.
[4] 2HCl.
[5] HCl hemihydrate.

What is claimed is:

1. A process for the preparation of 1-(3-amino-5-NR¹R²-6-chloropyrazinoyl)-3-R⁴-3-R⁵-guanidines of formula

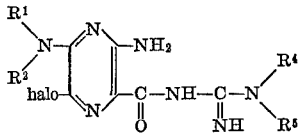

wherein halo is selected from the group consisting of chloro and bromo; R¹ is selected from the group consisting of hydrogen; lower alkyl, lower alkenyl and lower(cycloalkylalkyl); R² is selected from the group consisting of hydrogen, lower alkyl, lower alkenyl and C₃₋₆-cycloalkyl-C₁₋₂-alkyl; R⁴ is selected from the group consisting of hydrogen, lower alkyl, hydroxy-lower alkyl, phenyl-lower alkyl, (halo-phenyl)-lower alkyl, (lower alkyl-phenyl)-lower alkyl, (lower alkoxyphenyl)-lower alkyl, and pyridyl-lower alkyl; R⁵ is selected from the group consisting of hydrogen, lower alkyl, and phenyl-lower alkyl, (halophenyl)-lower alkyl, lower-(alkylphenyl)alkyl, lower-(alkoxyphenyl)alkyl; which comprises the treatment of 1-(3-amino-5-NR¹R²-6-chloropyrazinoyl)urea of formula

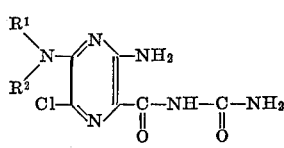

wherein R¹ and R² are as defined above, with a 3-R⁴-3-R⁵-guandine of formula

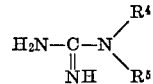

wherein R⁴ and R⁵ have the meanings assigned above in a non-hydroxylic polar solvent.

2. The process as claimed in claim 1, wherein the solvent is dimethylformamide.

3. The process as claimed in claim 1 wherein R⁴ and R⁵ are each lower alkyl and R⁴ and R⁵ are as defined therein.

4. The process as claimed in claim 1, wherein R¹ and R² are each hydrogen and R⁴ and R⁵ are as defined therein.

5. The process as claimed in claim 1, wherein R¹, R², R⁴ and R⁵ are each hydrogen, thus yielding (3,5-diamino-6-chloropyrazinoyl)guanidine.

6. The process as claimed in claim 1 wherein R¹ and R² are each lower alkyl and R⁴ and R⁵ are as defined therein.

7. The process as claimed in claim 1 wherein R¹ and R² are each lower alkyl and R⁴ and R⁵ are each hydrogen.

8. The process as claimed in claim 1 wherein R¹ and R² are each methyl and R⁴ and R⁵ are each hydrogen, thus forming (3-amino-5-dimethylamino-6-chloropyrazinoyl)-guanidine.

9. The process as claimed in claim 1, wherein R¹ is hydrogen, R² is lower alkyl, and R⁴ and R⁵ are as defined therein.

10. The process as claimed in claim 1, wherein $R^1$ is hydrogen, $R^2$ is lower alkyl, and $R^4$ and $R^5$ are each hydrogen.

11. The process as claimed in claim 1 wherein $R^1$ is hydrogen, $R^2$ is methyl and $R^4$ and $R^5$ are each hydrogen, thus forming (3-amino-5-methylamino-6 - chloropyrazinoyl)guanidine.

References Cited

UNITED STATES PATENTS 3,300,494   1/1967   Cragoe _____ 260—250

NICHOLAS S. RIZZO, Primary Examiner

UNITED STATES PATENT OFFICE
CERTIFICATE OF CORRECTION

Patent No. 3,539,569          Dated 11/10/70

Inventor(s) Roger J. Tull and Peter I. Pollak

It is certified that error appears in the above-identified patent and that said Letters Patent are hereby corrected as shown below:

In column 1, line 64, formula III, that portion of the formula reading

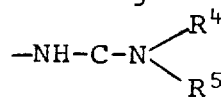   should read   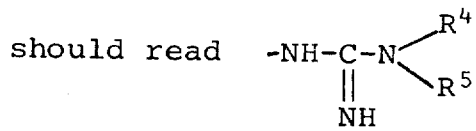

In column 2, line 33, the formula reading

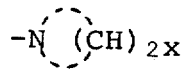   should read   

In column 6, line 59, Claim 3, delete the entire line and in its place insert --are each hydrogen and $R^1$ and $R^2$ are as defined therein.--

SIGNED AND SEALED
MAR 2 1971

(SEAL)
Attest:

Edward M. Fletcher, Jr.
Attesting Officer

WILLIAM E. SCHUYLER,
Commissioner of Patents